United States Patent
Goldschlager et al.

(10) Patent No.: US 10,057,137 B1
(45) Date of Patent: Aug. 21, 2018

(54) CABLE DISCOVERY WITH VISUAL DISPLAY OF A NETWORK TOPOLOGY

(71) Applicant: MARVELL INTERNATIONAL LTD., Hamilton (BM)

(72) Inventors: Robi Goldschlager, Tel-Aviv (IL); Ronen Tausi, Raanana (IL); Gad Hutt, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 470 days.

(21) Appl. No.: 14/078,013

(22) Filed: Nov. 12, 2013

Related U.S. Application Data

(60) Provisional application No. 61/725,174, filed on Nov. 12, 2012.

(51) Int. Cl.
*H04N 5/44* (2011.01)
*H04L 12/24* (2006.01)

(52) U.S. Cl.
CPC .................. *H04L 41/22* (2013.01)

(58) Field of Classification Search
CPC ........................................ H04L 49/25
See application file for complete search history.

(56) References Cited

U.S. PATENT DOCUMENTS

| | | | | |
|---|---|---|---|---|
| 6,252,872 B1 * | 6/2001 | Tzeng | ................. | H04L 45/7453 370/360 |
| 6,577,243 B1 * | 6/2003 | Dannenmann | ....... | H01R 13/641 324/66 |
| 6,681,248 B1 * | 1/2004 | Sears | ................. | H04Q 11/0478 370/254 |
| 7,225,244 B2 * | 5/2007 | Reynolds | .................. | G06F 1/14 709/203 |
| 7,349,960 B1 * | 3/2008 | Pothier | ............. | G06F 17/30539 709/223 |
| 7,684,416 B2 * | 3/2010 | Galin | ...................... | H04L 41/12 370/252 |
| 7,693,976 B2 * | 4/2010 | Perry | .................... | H04L 7/0008 340/1.1 |
| 8,725,878 B1 * | 5/2014 | Gillam | ............... | H04L 67/1097 709/226 |

(Continued)

OTHER PUBLICATIONS

Robi Goldschlager et al., U.S. Appl. No. 14/056,237, "Method and Apparatus for Path Indication", filed on Oct. 17, 2013.

(Continued)

*Primary Examiner* — Taghi T Arani
*Assistant Examiner* — F J Farhadian

(57) ABSTRACT

Aspects of the disclosure provide a method for highlighting a port of a network device in a network. The method includes receiving, by a processor, a selection of graphical element displayed at a graphical user interface. The network device is separate from the processor. The graphical element corresponds to a port of a network device in a network. The method further includes identifying, by the processor, the port and the network device at which the port is disposed, and transmitting an instruction to the network device to cause a specific signaling component associated with the port to have a different state from other signaling components associated with other ports of the network device in order to highlight the port at the network device to a user.

5 Claims, 2 Drawing Sheets

(56) References Cited

U.S. PATENT DOCUMENTS

| | | | | |
|---|---|---|---|---|
| 8,751,637 B2* | 6/2014 | Okita | | H04L 41/142 709/223 |
| 8,982,715 B2* | 3/2015 | Raza | | H01R 13/6658 370/252 |
| 2002/0071394 A1* | 6/2002 | Koziy | | H04M 3/244 370/248 |
| 2003/0020976 A1* | 1/2003 | Krishnaswamy | | H04Q 11/0062 398/5 |
| 2003/0149754 A1* | 8/2003 | Miller, II | | H04L 12/2602 709/223 |
| 2003/0225893 A1* | 12/2003 | Roese | | G01S 5/02 709/227 |
| 2004/0054863 A1* | 3/2004 | Harada | | G06F 21/10 711/164 |
| 2004/0212735 A1* | 10/2004 | Kitamura | | H04N 1/00291 348/553 |
| 2005/0089044 A1* | 4/2005 | Ciscon | | H04L 12/5695 370/395.21 |
| 2005/0091361 A1* | 4/2005 | Bernstein | | H04L 41/12 709/223 |
| 2005/0198247 A1* | 9/2005 | Perry | | H04L 7/0008 709/223 |
| 2006/0265509 A1* | 11/2006 | Pandit | | H04L 29/06027 709/230 |
| 2007/0076632 A1* | 4/2007 | Ghamami | | H04L 12/2697 370/254 |
| 2007/0283045 A1* | 12/2007 | Nguyen | | H04L 43/0811 709/245 |
| 2008/0056164 A1* | 3/2008 | Stratton | | H04L 12/185 370/260 |
| 2008/0309511 A1* | 12/2008 | Kerr | | G06F 1/1613 340/815.53 |
| 2009/0157912 A1* | 6/2009 | Kakizaki | | H04N 1/32502 710/18 |
| 2009/0177809 A1* | 7/2009 | Bhesania | | G06F 11/3055 710/19 |
| 2009/0322487 A1* | 12/2009 | Lange | | H04Q 9/00 340/10.3 |
| 2011/0238817 A1* | 9/2011 | Okita | | H04L 41/142 709/224 |
| 2011/0258302 A1* | 10/2011 | Cole | | G06F 11/006 709/223 |
| 2011/0269456 A1* | 11/2011 | Krishnaswamy | | H04W 8/26 455/426.1 |
| 2012/0102543 A1* | 4/2012 | Kohli | | H04L 63/20 726/1 |
| 2014/0036920 A1* | 2/2014 | McCormick | | H04L 41/12 370/392 |

OTHER PUBLICATIONS

Robi Goldschlager et al., U.S. Appl. No. 14/102,665, "Network Traffic View", filed Dec. 11, 2013.

Robi Goldschlager et al., U.S. Appl. No. 14/073,033, "Link Attributes Display", filed Nov. 6, 2013.

Robi Goldschlager et al., U.S. Appl. No. 14/056,237, "Method and Apparatus for Path Indication", filed Oct. 17, 2013.

* cited by examiner

CABLE DISCOVERY WITH VISUAL DISPLAY OF A NETWORK TOPOLOGY

INCORPORATION BY REFERENCE

This present disclosure claims the benefit of U.S. Provisional Application No. 61/725,174, "CABLE DISCOVERY" filed on Nov. 12, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, in a local area network (LAN), network infrastructure devices, such as switches, routers, and the like, are commonly housed in a central location for easy access. In an example, an office building uses a small room to keep the network switch devices for a LAN used in the office building. Then, host devices, such as computers, printers, IP phones, and the like, distributed at various places in the office building are connected to the network switch devices in the small room by cables.

SUMMARY

Aspects of the disclosure provide a method for highlighting a port of a network device in a network. The method includes receiving, by a processor, a selection of graphical element displayed at a graphical user interface. The graphical element corresponds to a port of a network device in a network. The network device is separate from the processor. The method further includes identifying, by the processor, the port and the network device at which the port is disposed, and transmitting an instruction to the network device to cause a specific signaling component associated with the port to have a different state from other signaling components associated with other ports of the network device in order to highlight the port at the network device to a user.

According to an aspect of the disclosure, the method includes transmitting the instruction to the network device to cause a lighting component to have a different light emitting state from other lighting components associated with the other ports of the network device. In an example, the method includes transmitting the instruction to the network device to cause the lighting component to flash. In another example, the method includes transmitting the instruction to the network device to cause the lighting component to have a different color from the other lighting components associated with the other ports of the network device.

In an embodiment, the switch device is among a plurality of other switch devices on a rack. Further, in an example, the instruction to the network device is sent via a Layer 3 protocol.

Aspects of the disclosure provide an apparatus that includes a user interface module and a processor. The user interface module is configured to provide a graphical user interface. The processor is configured to receive a selection of graphical element displayed at the graphical user interface. The graphical element corresponds to a port of a network device in a network. The network device is separate from the processor. The processor is further configured to identify the port and the network device at which the port is disposed and transmit an instruction to the network device to cause a specific signaling component associated with the port to have a different state from other signaling components associated with other ports of the network device in order to highlight the port to a user at the network device.

Aspects of the disclosure provide a non-transitory computer readable medium storing program instructions for causing a processor to execute operations for highlighting a port of a network device in a network. The operations include receiving, by the processor, a selection of graphical element displayed at a graphical user interface. The graphical element corresponds to a port of a network device in a network. The network device is separate from the processor. The operations further include identifying, by the processor, the port and the network device at which the port is disposed, and transmitting an instruction to the network device to cause a specific signaling component associated with the port to have a different state from other signaling components associated with other ports of the network device in order to highlight the port to a user at the network device.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
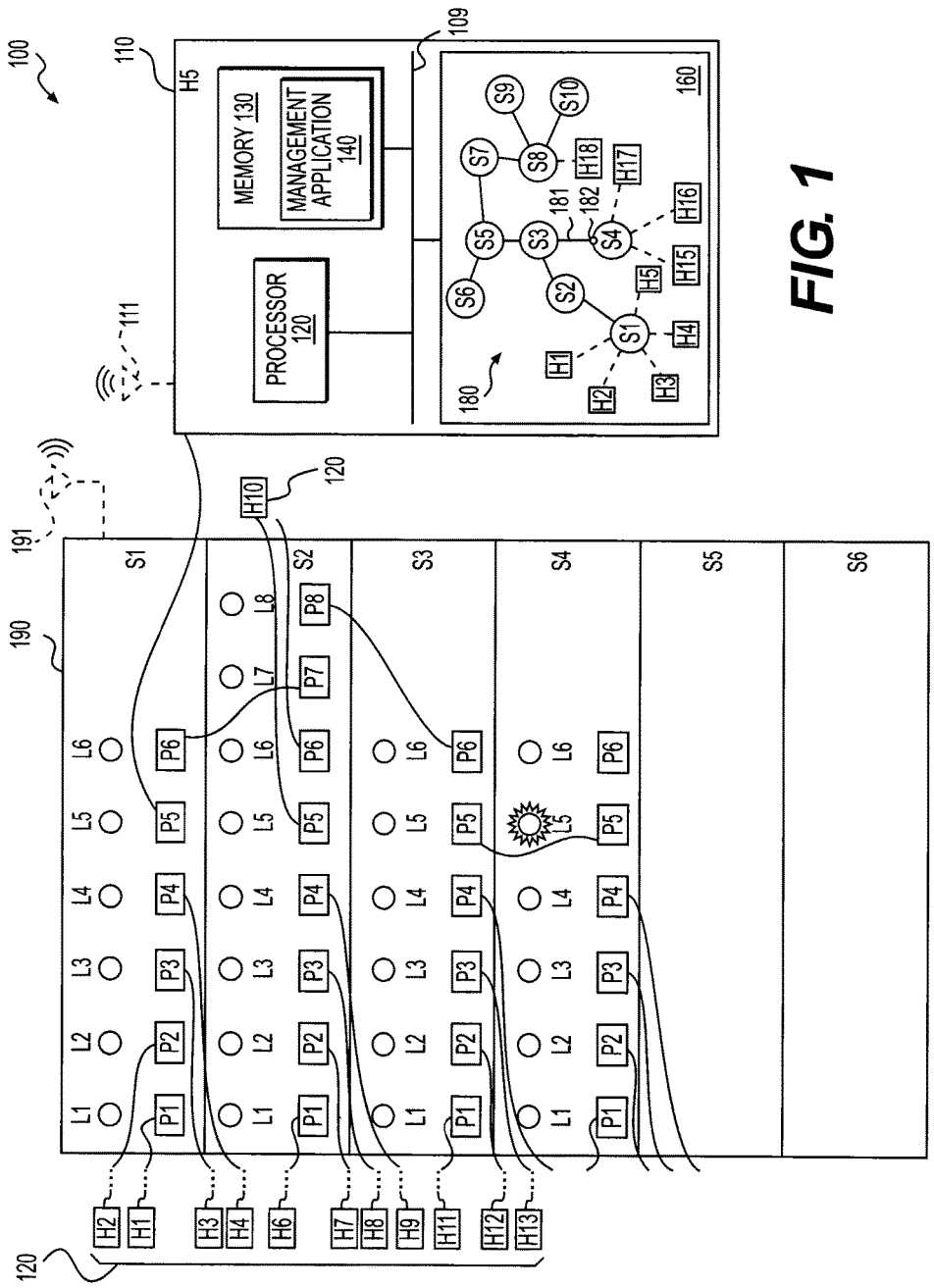
FIG. 1 shows a diagram of a network example 100 according to an embodiment of the disclosure.

FIG. 1 shows a diagram of a network example 100 according to an embodiment of the disclosure. In an example, the network 100 includes a plurality of network devices coupled together to form a plurality of nodes in the network 100. For example, the network 100 includes host devices 120, such as host devices H1-H13 and the like, that form the host nodes. Further, the network 100 includes switch devices, such as switch devices S1-S6 and the like, that form the switch nodes. In an embodiment, the host devices are distributed at various locations and the switch devices are located at a central place.

According to an aspect of the disclosure, among the devices, at least one device, such as the host device H5, is configured to provide a network topology 180 to a user via a user interface. Further, the host device H5 is configured to assist the user to discover a specific port or a specific cable connected to the port among a large number of ports and cables in the network 100. In an example, the host device H5 is configured to receive, a selection of an element at the user interface. In an example, the element corresponds to a port of a switch device in the network 100. The host device H5 then transmits an instruction to the switch device to cause the port to be highlighted, such that the user can easily locate the port or the cable connected to the port.

The network 100 is any suitable network, in an embodiment. In an example, the network 100 is a local area network (LAN) 100. The LAN 100 is a Layer 2 network that uses a data link protocol, such as Ethernet protocol, and the like, for communication between host devices in the LAN. In the FIG. 1 example, the LAN 100 is coupled to the Internet (not shown) via a router (not shown) for example. In an example, communication to the Internet crosses the border of the LAN 100 and continues using a higher level protocol, such as Layer 3 protocol, and the like.

The host devices can be any suitable electronic devices, such as voice over IP (VoIP) phones, computers, laptops, TVs, servers, and the like that are configured to be a source of network traffic and/or a destination of network traffic. Generally, an electronic device includes one or more network interface controllers (NICs) connected to the switch devices via wired or wireless connections. It is noted that when the electronic device includes multiple NICs connected to the switch devices, the electronic device is considered as a set of host devices and each connection has its own MAC address. The host devices communicate with each other via the switch devices. Generally, the host devices and wireless access point devices are distributed at various places in a building. The devices located at the various places are connected to the switch devices in a central place via cables.

The switch devices S1-S6 can be any suitable switch devices. Generally, a switch device includes a plurality of ports connected to host devices and/or other switch devices. The switch device is configured to receive a network traffic unit (e.g., a data link frame) from a port (e.g., ingress port) and forward the received network traffic unit to one or more ports (e.g., egress ports) based on network configuration information. In an embodiment, the network configuration information is stored in a plurality of tables within a switch device. The network configuration information includes, for example, port connectivity information of the switch device, port connectivity information of other switch devices in the LAN 100, virtual LAN (VLAN) configuration, and the like.

Generally, in an example, the switch devices in a network are typically placed at one central place for easy access and central management. In the FIG. 1 example, the switch devices S1-S6 are installed on a rack 190 in a communications room. In an embodiment, the rack 190 is configured to provide a central controlled environment for the operation of the switch devices S1-S6. For example, the rack 190 has a power system configured to provide a central controlled electrical power to the switch devices S1-S6. It is noted that the central place can include more racks with more switch devices.

According to an aspect of the disclosure, generally, the switch devices and the host devices are connected by cables. A LAN can include a large number of the host devices and switch devices and may require a large number of cables to connect the host devices with ports of the switch devices. From time to time, a network administrator may need to locate a specific port, or a cable connected to a specific port for the purpose of troubleshooting, reconfiguration, for example.

According to an aspect of the disclosure, the switch devices include signaling components associated with ports in the switch devices. In the FIG. 1 example, for example, the switch device S4 includes signaling components L1-L6 respectively associated with ports P1-P6 in the switch device S4. The signaling components can be any suitable components. In an example, the signaling components L1-L6 are lighting devices, such as light emitting diodes (LED) and the like. In addition, the switch device S4 includes a controller configured to respectively control the signaling states of the signaling components L1-L6.

Further, a management application is implemented in a network device, such as one of the host devices and the switch devices, within the LAN 100. The management application is configured to determine a specific port in a switch device to highlight, and send an instruction to the switch device to cause a signaling component associated with the specific port to have a different signaling state from other signaling components of the switch device in order to highlight the specific port. Thus, the user can easily discover the specific port. Further, in an example, the user can discover a cable in connection with the specific port.

In an embodiment, a signaling component is configured to have a flashing state while the other signaling components have a steady state to highlight the signaling component. In another embodiment, a signaling component is configured to emit a different color of light from the other signaling components.

In the FIG. 1 example, the management application is implemented in a computer H5, labeled with reference numeral 110. The computer H5 is used for network administration and is coupled to port 5 (P5) of the switch device S1 in an example. In another example, the computer H5 communicates with the switch device S1 wirelessly, for example, via antennas 111 and 191.

In the FIG. 1 example, the computer H5 includes a processor 120, a memory module 130 and a user interface module 160 coupled together by a bus 109. The processor 120 executes system and application codes to perform system functions and application functions. The memory module 130 stores the system and application codes, such as codes 140 for the management application. In addition, the memory module 130 stores data processed or to be processed by the processor 120.

In an example, the memory module 130 stores network configuration information, such as a network topology for the LAN 100. The network topology includes, for example, coupling information of host devices to ports of the switch devices, coupling pairs of ports of different switch devices, relationship of workgroups to VLANs, VLAN membership, and the like. In an example, the memory module 130 stores a database (not shown) holding the network topology information, such as disclosed in Assignee's co-pending application Ser. No. 14/056,237, filed Oct. 17, 2013, which is incorporated herein by reference in its entirety. The memory module 130 can include any suitable memory, such as a hard disk drive, an optical storage medium, a solid-state drive, and the like.

In an embodiment, the processor 120 executes the codes 140 for the management application to access the network topology, and provide the network topology to a user. It is noted that the network topology can be stored in another device in the LAN 100, such as in the switch devices S1, S2, S3, S4 and the like, and can be accessed by the processor 120.

The user interface module 160 enables communication between the computer 110 and a user. The user interface module 160 can include any suitable component, such as a touch screen, a display, a keyboard, a mouse, a printer, and the like. In the FIG. 1 example, the user interface module 160 provides a graphical user interface (GUI) to interact with a user, for example a network administrator, in a graphical manner. For example, the GUI presents to the user a graphical network topology 180 on a display screen. Specifically, the GUI uses suitable graphical elements, such as picture icons, to represent devices, such as the host devises, the switch devices and the like. In an example, the GUI includes laptop icons, desktop icons, phone icons, switch icons and the like to respectively represent the devices in the network 100 based on the types of devices. In the FIG. 1 example, the GUI uses circles representing the switch devices and uses squares representing the host devices.

Further, the GUI uses graphical line elements to represent physical links or cables that connect the devices in the network 100. According to an aspect of the disclosure, the GUI is configured to enable line element selection and/or terminal selection of the line element. In the FIG. 1 example, a graphical line element 181 links a first circle S3 and a second circle S4. The first circle S3 represents the switch device S3 on the rack 190, the second circle S4 represents the switch device S4 on the rack 190, and the line element 180 represents the cable connecting port P5 of the switch device S3 with port P5 of the switch device S4. The terminals of the line element 181 can be respectively selected. In the FIG. 1 example, a terminal 182 of the line element 181 is selected. The terminal 182 corresponds the port P5 of the switch device S4.

According to an aspect of the disclosure, when the terminal 182 of the line element 181 is selected by the GUI, the management application identifies the switch device, such as the switch device S4, and the port, such as the port P5, corresponding to the selected terminal 182. Then, the management application sends an instruction to the switch device S4. In an example, the instruction is sent via a higher level protocol, such as a Layer 3 protocol, and the like. The instruction causes the switch device S4 to highlight the port P5 of the switch device S4. Specifically, in the FIG. 1 example, the instruction causes the switch device S4 to turn on a LED L5 associated with the port P5, while the other LEDs associated with other LEDs are turned off. It is noted that other suitable techniques, such as a flash technique, a color technique, and the like can be used to highlight the port P5. Thus, the user can easily discover, for example the port P5 of the switch device S4, or a cable connected to the port P5 of the switch device S4.

According to another aspect of the disclosure, an electronic device other than the switch devices in the network 100 includes multiple NICs and signaling components associated with the NICs. The electronic device is represented as a set of host devices 120 that each corresponds to an NIC. When a terminal of a line element connecting a host device icon is selected by the GUI, the management application identifies the electronic device and the NIC to which the host device icon corresponds. Then, the management application sends an instruction to the electronic device. In an example, the instruction is sent via a higher level protocol, such as a Layer 3 protocol, and the like. The instruction causes the electronic device to highlight the NIC of the electronic device. In an example, the instruction causes a signaling component associated with the NIC to have a different state from other signaling components associated with the other NICs of the electronic device.

Figure 2:
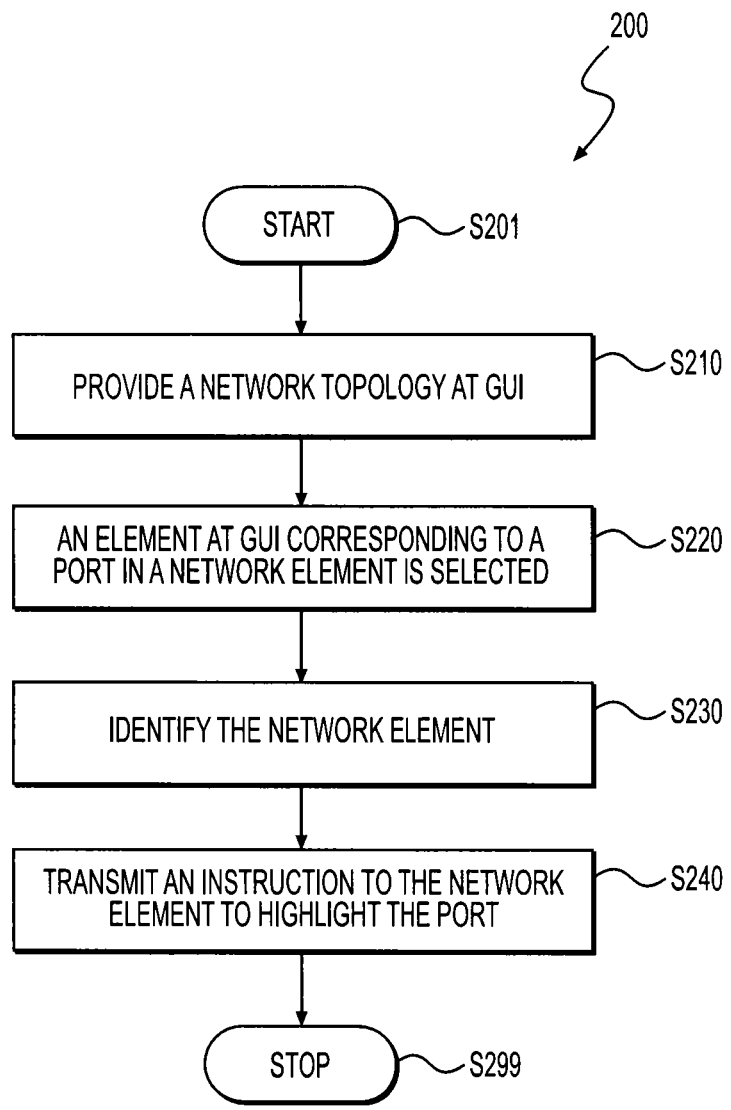
FIG. 2 shows a flow chart outlining a process example 200 according to an embodiment of the disclosure.

FIG. 2 shows a flowchart outlining a process 200 according to an embodiment of the disclosure. In an example, the process 200 is executed when the processor 120 executes the codes 140 of the management application. The process starts at S201 and proceeds to S210.

At S210, a network topology is provided at a GUI. In the FIG. 1 example, the processor 120 executes the management application codes 140, and accesses a database of network configuration. Based on the network configuration, the processor 120 determines the network topology, and provides the graphical network topology 180 to, for example a network administrator, via the GUI.

At S220, an element at the GUI corresponding to a port of a network device is selected. In the FIG. 1 example, the terminal 182 of the line element 181 is selected. The line element 181 connects the two circle elements S3 and S4 at the GUI. The circle S3 corresponds to the switch device S3 on the rack 190 and the circle S4 corresponds to the switch device S4 on the rack 190. The line element 181 corresponds to the cable connecting the port P5 of the switch device S3 and the port P5 of the switch device S4. The terminal 182 corresponds to the port P5 of the switch device S4.

At S230, a network element and a port of the network element is identified. In the FIG. 1 example, the processor 120 identifies the switch device S4 and the port P5 of the switch device S4 based on the network configurations stored in the database.

At S240, an instruction is sent to the identified network element to highlight the identified port. In the FIG. 1 example, the processor 120 sends an instruction to the switch device S4, for example, based on a Layer 3 communication protocol. In response to the instruction, the controller in the switch device S4 turns on the signaling component L5 associated with the port P5, and keeps the other signaling components, such as L1-L4 and L6 of the switch device S4 to be turned off. Thus, the port P5 in the switch device S4 is highlighted. It is noted that, in another example, other suitable signaling technique, such as flashing, turning on a different color LED, and the like is used to highlight the port. Then the process proceeds to S299 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for highlighting a port of a network device in a network, comprising:

receiving, by a processor that is separate from any network device on the network operating with Layer 2 protocol, a network topology description of the network, the network topology description being displayed at a graphical user interface of the processor, the network topology description representing a topology of the network as a graph including at least a plurality of nodes and a plurality of line elements connecting the nodes, the nodes graphically representing at least a plurality of network devices that are centrally bundled and controlled in a rack housed in a room of a building, a plurality of host devices that are distributed across different areas of the building, a plurality of ports of the network devices, the line elements graphically representing corresponding network links coupling network devices and host devices via the network interface controllers of respective ports;

storing a database of network topology configurations for the network;

selecting, via the graphical user interface, one of terminals of the line elements elements, the one of terminals corresponding to one of the network interface controllers;

identifying, by the processor, a port to which a network interface controller, represented by the selected terminal of line element, is connected and a network device at which the identified port is disposed based on the database of the network topology configurations; and transmitting an instruction to the network device via a Layer 3 protocol to (i) cause a specific signaling component associated with the port to which the network interface controller, represented by the selected terminal of line element, is connected to have a different state from other signaling components associated with other ports of the network device to highlight with a physical light of the rack to a user of the network the port at the network device to which the network interface controller, represented by the selected terminal of line element, is connected, and (ii) further to cause the physical light to have a different light emitting state from other lighting components associated with the other ports of the network device, causing the physical light to have the different light emitting state including at least causing the physical light to have a different color from the other lighting components associated with the other ports of the network device or causing the physical light to flash.

2. The method of claim 1, wherein transmitting the instruction to the network device to cause the specific signaling component associated with the port to have the different state from other signaling components associated with other ports of the network device in order to highlight the port to the user at the network device further comprises:
 transmitting the instruction to one of a plurality of switch devices on the rack to cause the specific signaling component associated with the port to have the different state from other signaling components associated with the other ports of the switch devices on the rack.

3. An apparatus comprising:
 a user interface module configured to provide a graphical user interface; and
 a processor that is separate from any network device on a network operating with Layer 2 protocol, the processor configured to:
  receive a network topology description of the network, the network topology description being displayed at the graphical user interface of the processor, the network topology description representing a topology of the network as a graph including at least a plurality of nodes and a plurality of line elements connecting the nodes, the nodes graphically representing at least a plurality of network devices that are centrally bundled and controlled in a rack housed in a room of a building, a plurality of host devices that are distributed across different areas of the building, a plurality of ports of the network devices, the line elements graphically representing corresponding network links coupling network devices and host devices via the network interface controllers of respective ports;
  store a database of network topology configurations for the network;
  select, via the graphical user interface, one of terminals of the line elements, the one of terminals corresponding to one of the network interface controllers;
  identify a port to which a network interface controller, represented by the selected terminal of line element, is connected and the network device at which the identified port is disposed based on the database of the network topology configurations; and
  transmit an instruction to the network device via a Layer 3 protocol to
  (i) cause a specific signaling component associated with the port to which the network interface controller, represented by the selected terminal of line element, is connected to have a different state from other signaling components associated with other ports of the network device to highlight with a physical light of the rack to a user of the network the port at the network device to which the network interface controller, represented by the selected terminal of line element, is connected, and
  (ii) further to cause the physical light to have a different light emitting state from other lighting components associated with the other ports of the network device, causing the physical light to have the different light emitting state including at least causing the physical light to have a different color from the other lighting components associated with the other ports of the network device or causing the physical light to flash.

4. The apparatus of claim 3, wherein the processor is configured to transmit the instruction to one of a plurality of switch devices on the rack to cause the specific signaling component associated with the port to have the different state from other signaling components associated with the other ports of the switch devices on the rack.

5. A non-transitory computer readable medium storing program instructions for causing a processor to execute operations for highlighting a port of a network device in a network, the operations comprising:
 receiving, by the processor that is separate from any network device on the network operating with Layer 2 protocol, a network topology description of the network, the network topology description being displayed at a graphical user interface of the processor, the network topology description representing a topology of the network as a graph including at least a plurality of nodes and a plurality of line elements connecting the nodes, the nodes graphically representing at least a plurality of network devices that are centrally bundled and controlled in a rack housed in a room of a building, a plurality of host devices that are distributed across different areas of the building, a plurality of ports of the network devices, the line elements graphically representing corresponding network links coupling network devices and host devices via the network interface controllers of respective ports;
 storing a database of network topology configurations for the network;
 selecting, via the graphical user interface, one of terminals of the line elements, the one of terminals corresponding to one of the network interface controllers;
 identifying, by the processor, a port to which a network interface controller, represented by the selected terminal of line element is connected and the network device at which the identified port is disposed based on the database of the network topology configurations; and
 transmitting an instruction to the network device via a Layer 3 protocol to
 (i) cause a specific signaling component associated with the port to which the network interface controller, represented by the selected terminal of line element, is connected to have a different state from other signaling components associated with other ports of the network device to highlight with a physical light of the rack to a user of the network the port at the network device to which the network interface controller, represented by the selected terminal of line element, is connected, and
 (ii) further to cause the physical light to have a different light emitting state from other lighting components associated with the other ports of the network device, causing the physical light to have the different light emitting state including at least causing the physical light to have a different color from the other lighting components associated with the other ports of the network device or causing the physical light to flash.

\* \* \* \* \*